(12) United States Patent
Nigrin

(10) Patent No.: US 6,311,579 B1
(45) Date of Patent: Nov. 6, 2001

(54) ASSEMBLY COMPRISED OF A STEERING WHEEL AND A STEERING SHAFT

(75) Inventor: Anke Nigrin, Lohr (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/594,006

(22) Filed: Jun. 14, 2000

(30) Foreign Application Priority Data

Jun. 15, 1999 (DE) .......................................... 299 10 482 U

(51) Int. Cl.[7] .................................................... B62D 1/10
(52) U.S. Cl. ............................................. 74/552; 403/325
(58) Field of Search ............................. 74/552; 403/324, 403/325

(56) References Cited

U.S. PATENT DOCUMENTS

| | | | | |
|---|---|---|---|---|
| 2,794,633 | * | 6/1957 | Delany | 403/325 X |
| 4,247,216 | * | 1/1981 | Pansini | 403/324 X |
| 5,816,112 | * | 10/1998 | Hosoi et al. | 74/552 |
| 5,855,449 | * | 1/1999 | Thomas | 74/552 X |
| 5,855,451 | * | 1/1999 | Milton et al. | 74/552 X |

FOREIGN PATENT DOCUMENTS

2276702 * 10/1994 (GB) ................................... 74/552

* cited by examiner

*Primary Examiner*—Mary Ann Green
(74) *Attorney, Agent, or Firm*—Tarolli, Sundheim, Covell, Tummino & Szabo L.L.P.

(57) ABSTRACT

In an assembly comprised of a steering wheel and a steering shaft, the steering wheel has a holding surface and two tensioning pins. The steering shaft has a longitudinal axis and two detent hooks which are movable between a detent position in which they engage the holding surface of the steering wheel and fix the steering wheel in an axial direction with respect to the steering shaft, and a release position in which the steering wheel can be drawn off from the steering shaft. The tensioning pins engage at the detent hooks such that the detent hooks can be brought from the detent position into the release position by means of the tensioning pins. Each of the tensioning pins is accessible from outside of the steering wheel.

7 Claims, 2 Drawing Sheets

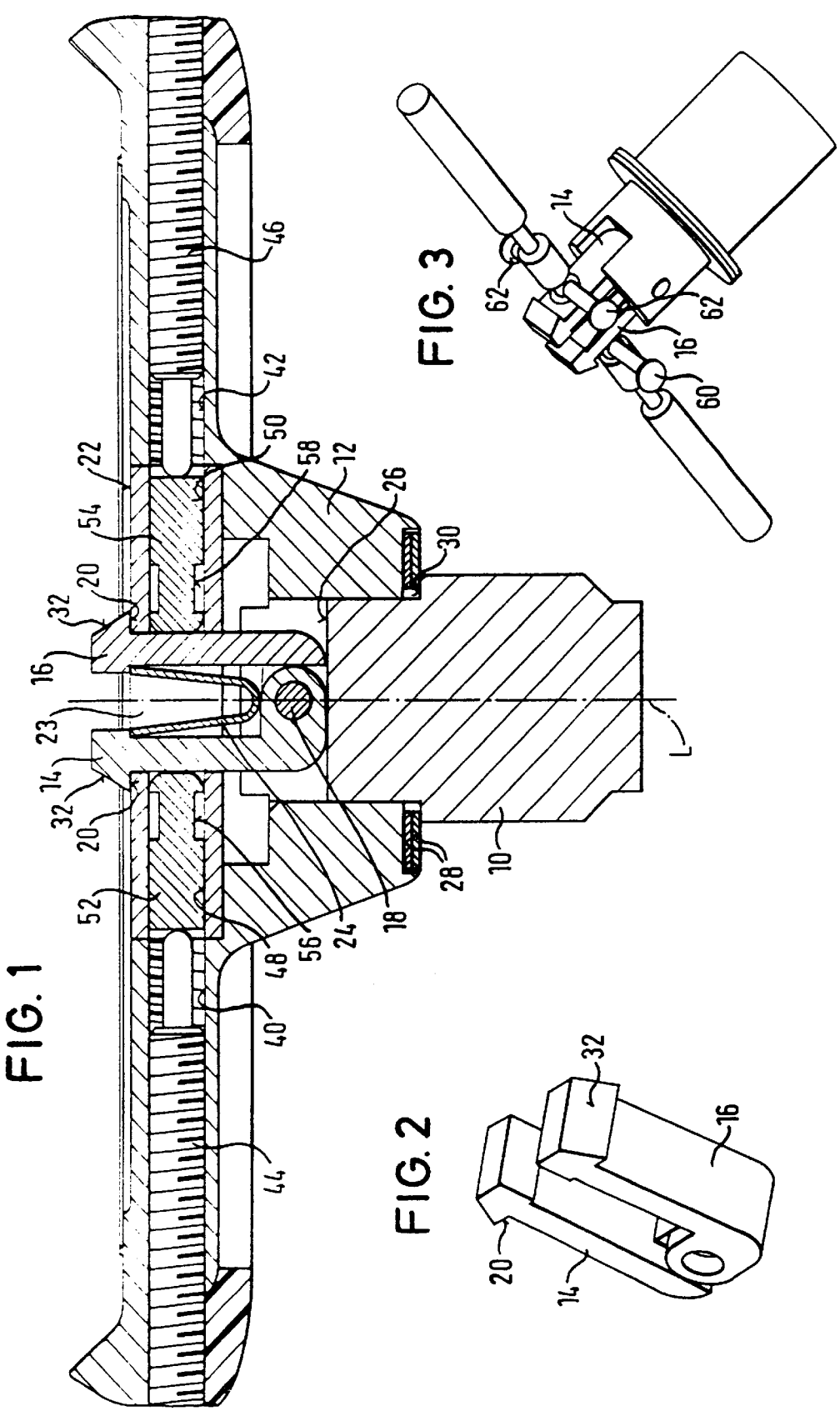

ASSEMBLY COMPRISED OF A STEERING WHEEL AND A STEERING SHAFT

TECHNICAL FIELD

The invention relates to an assembly comprised of a vehicle steering wheel and a steering shaft.

BACKGROUND OF THE INVENTION

In conventional assemblies of this type, the steering wheel comprises a holding surface so that it can be attached to the steering shaft. Such an assembly is known from the German Patent 195 44 580. There are disclosed detent hooks which fasten the steering wheel in axial direction in a form-fitting manner to the steering shaft. To release the steering wheel, the detent hooks must be moved into the release position. For this purpose, extensions are provided on the detent hooks, which project into the interior of the steering wheel and which can be acted upon by a suitable tool. In this construction, so that the steering wheel can be released from the steering shaft, the gas bag module, which is arranged in the interior in modern steering wheels, must be removed, because otherwise no access is possible to the extensions of the detent hook.

BRIEF SUMMARY OF THE INVENTION

The invention provides an assembly in which the detent hooks can be brought into their release position without functional parts having to be removed from the interior of the steering wheel. For this purpose, in the assembly according to the invention, the steering wheel has a holding surface and two tensioning pins. The steering shaft has a longitudinal axis and two detent hooks which are movable between a detent position in which they engage the holding surface of the steering wheel and fix the steering wheel in an axial direction with respect to the steering shaft, and a release position in which the steering wheel can be drawn off from the steering shaft. The tensioning pins engage at the detent hooks such that the detent hooks can be brought from the detent position into the release position by means of the tensioning pins. Each of the tensioning pins is accessible from outside of the steering wheel. Thus, the detent hooks can be brought into the release position by means of the tensioning pins, without access to the interior of the steering wheel being necessary and in particular without functional parts having to be removed from the interior of the steering wheel, so that the steering wheel can be removed from the steering shaft. The tensioning pins can either be present permanently on the steering wheel, or only be screwed into the corresponding bores in the steering wheel for the purpose of dismantling.

According to a preferred embodiment of the invention, provision is made that the detent hooks are pivotally arranged on a common axis, which extends perpendicularly to the longitudinal axis of the steering shaft and runs through this longitudinal axis. This leads to a particularly compact construction, so that the opening which is necessary in the steering wheel for the passage of the detent hooks can be small in construction.

Preferably, provision is made that between each tensioning pin and the associated detent hook, a slider element is arranged. Thus, the tensioning pin no longer engages directly on the corresponding detent hook, which provides various structural freedoms. For example, each slider element can be provided with a groove into which a stop engages. This stop delimits the maximum displacement distance of the slider element, so that the angle can be delimited about which the detent hooks can be swiveled from their detent position into the release position. In this way, it can be reliably prevented that a spring which acts upon the detent hooks so as to move into the detent position, is stressed excessively intensively on transferring the detent hooks into the release position. This is important, in order to ensure, with the renewed arresting of the steering wheel on the steering shaft, that the detent hooks engage with the necessary security on the holding surface.

The spring which acts upon the detent hooks into the detent position is preferably a leaf spring which is arranged between the detent hooks. This leads to a particularly compact construction.

Preferably, provision is made that the steering shaft is provided with a shoulder and between this shoulder and an associated surface of the steering wheel at least one disc spring is arranged. This disc spring compensates for any play, so that the steering wheel is firmly arranged on the steering shaft.

Advantageous embodiments of the invention will be apparent from the sub-claims.

BRIEF DESCRIPTION OF THE DRAWINGS

FIG. 1 shows in a cross-section an assembly according to the invention, with a steering shaft and a steering wheel arranged thereon;

FIG. 2 shows in a perspective view the detent hooks used in the assembly according to the invention;

FIG. 3 shows in a perspective view the steering shaft with the detent hooks and also the functional parts used to actuate the detent hooks; the steering wheel, into which the functional parts are embedded, having been omitted;

DETAILED DESCRIPTION OF THE PREFERRED EMBODIMENT

Figure 4:
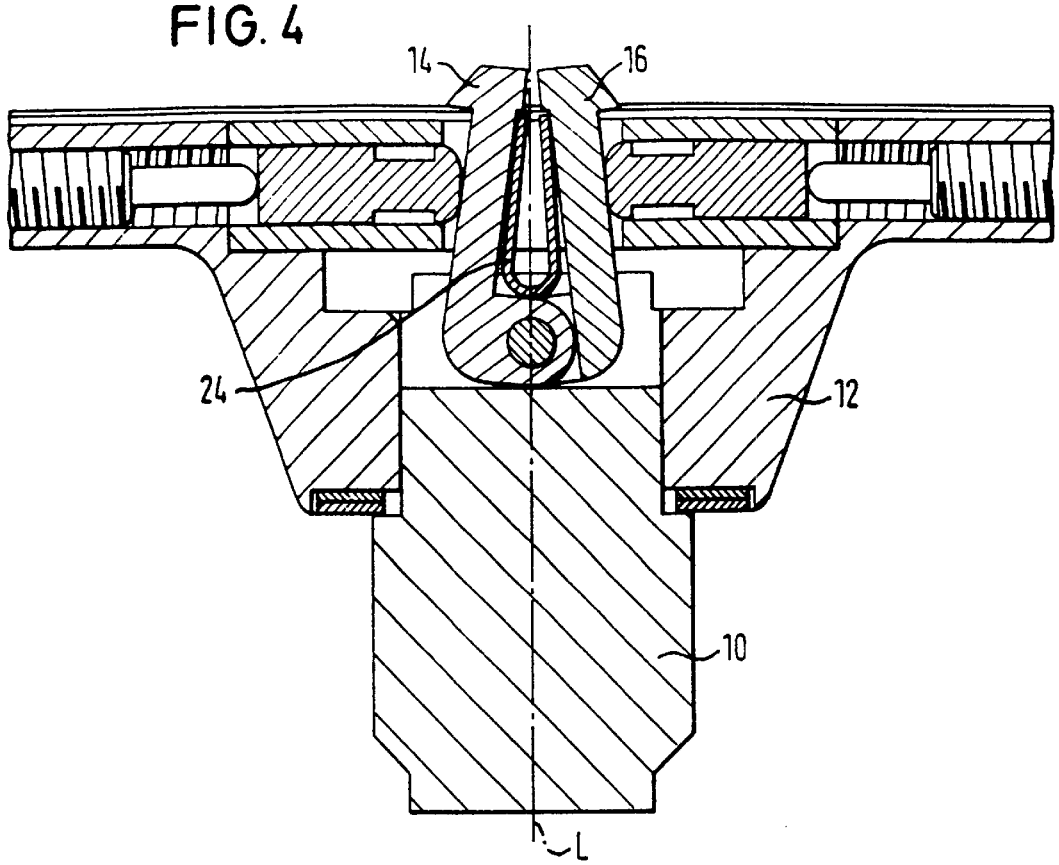
FIG. 4 shows in a view corresponding to that of FIG. 1 the assembly with the detent hooks in their release position.
Figure 5:
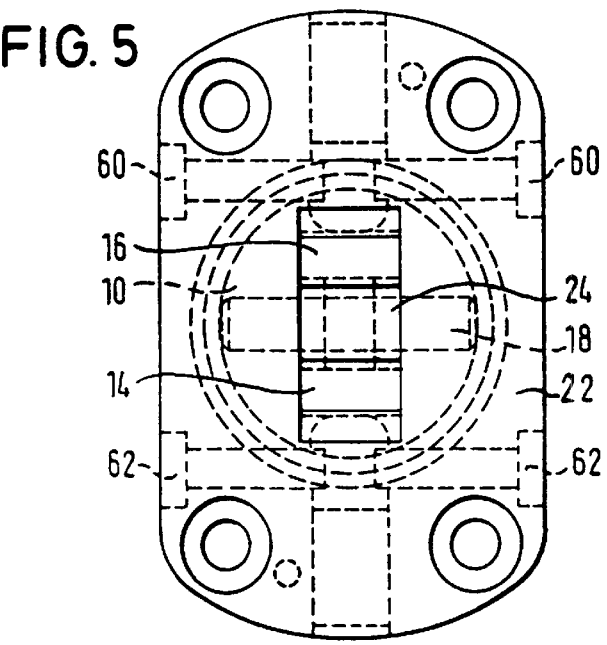
FIG. 5 shows in a top view the assembly according to the invention.

In FIG. 1, an assembly according to the invention is illustrated in a section. This consists substantially of a steering shaft 10 with which a steering wheel 12 is to be firmly connected. Of the steering wheel, only a part of the basic body is shown here; the steering wheel spokes and also the interior of the steering wheel, in which usually a gas bag module is arranged, are not illustrated here.

On the steering shaft 10, two detent hooks 14, 16 are mounted pivotally on an axis 18. The axis 18 extends perpendicularly to the longitudinal axis L of the steering shaft 10 and runs through this.

Each detent hook 14, 16 is provided with a detent surface 20, which can lie against a holding surface 22 constructed on the inner face of the steering wheel 12. In the holding surface 22 a passage opening 23 is formed, which makes possible the passage of the detent hooks 14, 16, so that the detent surfaces 20 can arrive onto the side of the steering wheel 12 facing away from the steering shaft 10.

Between the two detent hooks 14, 16, a leaf spring 24 is arranged, which acts upon the detent hooks so as to move outwards. This outward movement is, however, delimited by abutment of the lower end of the detent hooks on a support surface 26 on the steering shaft 10.

To arrange the steering wheel 12 on the steering shaft 10, firstly two disc springs 28 are placed onto a shoulder 30 of the steering shaft 10. Then the steering wheel is placed onto the steering shaft so that bevels 32 formed on the detent hooks press the detent hooks inwards, so that they can pass through the opening 23. As soon as the steering wheel is placed far enough onto the steering shaft 10, the detent hooks 14, 16 snap outwards under the action of the leaf spring 24, so that the detent faces 20 lie against the holding surface 22 of the steering wheel and the steering wheel is secured in axial direction on the steering shaft. The disc springs 28, in so doing, eliminate any play. The opening 23 is constructed here such that together with the detent hooks 14, 16 a rotary movement of the steering wheel 12 is transferred onto the steering shaft 10.

When the steering wheel 12 has to be released from the steering shaft 10 again, the detent hooks must be brought from their detent position shown in FIGS. 1 to 5 into their release position shown in FIG. 4, in which the detent hooks 14, 16 are swiveled so far towards the longitudinal axis L of the steering shaft that the steering wheel can be freely removed.

For this purpose, two threaded bores 40, 42 running in radial direction are formed in the steering wheel 12 which extend perpendicularly to the longitudinal axis L of the steering shaft 10 and open out on the outer face of the steering wheel. A tensioning pin 44, 46 is screwed into each threaded bore 40, 42.

Adjoining each threaded bore 40, 42 is a bore 48, 50 at the end lying radially on the inside, in which bore 48, 50 one slider element 52, 54 each is arranged. Each slider element 52, 54 is provided with a groove 56, 58, into which two stops 60, 62 each engage.

The arrangement and dimensions of the stops 60, 62 are coordinated with the dimensions of the grooves 56, 58 of the slider elements 52, 54 such that each slider element can be moved between a radially exterior position in which it is drawn back so far that the corresponding detent element can be situated in the detent position, and a radially interior position, in which each detent element is swiveled so far towards the longitudinal axis L that the steering wheel can be freely removed. In this way it is prevented that via the tensioning pins, which can be screwed with a suitable tool from outside the steering wheel into the latter, the detent hooks 14, 16 can be swiveled so far inwards beyond the release position that the leaf spring 24 is damaged.

What is claimed is:

1. An assembly comprised of a steering wheel and a steering shaft, said steering wheel having a holding surface and two tensioning pins, said steering shaft having a longitudinal axis and two detent hooks which are movable between a detent position in which they engage at said holding surface of said steering wheel and fix said steering wheel in an axial direction with respect to said steering shaft, and a release position in which said steering wheel can be drawn off from said steering shaft, said tensioning pins engaging at said detent hooks such that said detent hooks can be brought from said detent position into said release position by means of said tensioning pins, each of said tensioning pins being accessible from outside said steering wheel.

2. The assembly of claim 1, wherein said detent hooks are arranged pivotally on a common axis, said common axis extending perpendicularly to said longitudinal axis of said steering shaft and intersecting said longitudinal axis.

3. The assembly of claim 1, wherein said steering shaft has a shoulder, a disc spring being arranged between said shoulder and an associated surface of said steering wheel.

4. The assembly of claim 1, wherein two slider elements are provided, which are arranged between said tensioning pins and said detent hooks.

5. The assembly of claim 4, wherein each of said slider elements is provided with a groove, into which a stop engages.

6. The assembly of claim 1, wherein each of said tensioning pins extends in radial direction with respect to said steering shaft to an outside of said steering wheel.

7. The assembly of claim 1, wherein a leaf spring is provided which is arranged between said detent hooks.

\* \* \* \* \*